(12) United States Patent
Ha et al.

(10) Patent No.: US 7,808,590 B2
(45) Date of Patent: Oct. 5, 2010

(54) ARRAY SUBSTRATE FOR A TRANSFLECTIVE LIQUID CRYSTAL DISPLAY DEVICE INCLUDING A REFLECTIVE PLATE HAVING A TRANSMISSIVE HOLE AND FABRICATING METHOD THEREOF

(75) Inventors: Kyoung-Su Ha, Seoul (KR); Won-Seok Kang, Seoul (KR); Joo-Soo Lim, Kumi-si (KR); Se-duk Kim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/292,529

(22) Filed: Nov. 20, 2008

(65) Prior Publication Data

US 2009/0096969 A1    Apr. 16, 2009

Related U.S. Application Data

(62) Division of application No. 11/166,197, filed on Jun. 27, 2005, now Pat. No. 7,468,767, which is a division of application No. 10/233,664, filed on Sep. 4, 2002, now Pat. No. 6,919,934.

(30) Foreign Application Priority Data

Sep. 7, 2001    (KR) ................. 2001-55211

(51) Int. Cl.
G02F 1/1335 (2006.01)
G02F 1/1333 (2006.01)

(52) U.S. Cl. ............... 349/114; 349/113; 349/111; 349/110

(58) Field of Classification Search ............... 349/43, 349/111, 113, 114, 42–44, 11; 257/59, 72; 345/92
See application file for complete search history.

(56) References Cited

U.S. PATENT DOCUMENTS 5,825,449 A * 10/1998 Shin .................... 349/148

(Continued)

FOREIGN PATENT DOCUMENTS

KR    2001-47095    6/2001

(Continued)

*Primary Examiner*—Hoan C Nguyen
(74) *Attorney, Agent, or Firm*—McKenna Long & Aldridge

(57) ABSTRACT

A fabricating method of an array substrate for a transflective liquid crystal display device includes: forming a gate electrode and a gate line on the substrate; depositing a first insulating layer on the gate electrode and the gate line; forming an active layer on the first insulating layer over the gate electrode; forming an ohmic contact layer on the active layer; forming source and drain electrodes on the ohmic contact layer, and a data line connected to the source electrode, the data line defining a pixel region with the gate line; depositing a second insulating layer on the source and drain electrodes, and the data line, the second insulating layer having an inorganic material; forming a reflective plate on the second insulating layer at the pixel region, the reflective plate having a transmissive hole; forming a third insulating layer on the reflective plate; and forming a pixel electrode on the third insulating layer at the pixel region, the pixel electrode being transparent and connected to the drain electrode.

14 Claims, 11 Drawing Sheets

U.S. PATENT DOCUMENTS

| | | |
|---|---|---|
| 5,910,830 A | 6/1999 | Nam |
| 5,917,563 A | 6/1999 | Matsushima |
| 6,080,515 A * | 6/2000 | Kim et al. .................. 430/7 |
| 6,166,400 A | 12/2000 | Chang et al. |
| 6,373,548 B1 * | 4/2002 | Kim ........................ 349/158 |
| 6,466,280 B1 | 10/2002 | Park et al. |
| 6,490,019 B2 | 12/2002 | Lee et al. |
| 6,532,045 B2 | 3/2003 | Chung et al. |
| 6,556,257 B2 | 4/2003 | Ino |
| 6,654,076 B2 | 11/2003 | Ha et al. |
| 6,822,708 B2 * | 11/2004 | Fujino ....................... 349/113 |
| 6,919,934 B2 | 7/2005 | Ha et al. |
| 2002/0033918 A1 * | 3/2002 | Shigeno et al. ............ 349/114 |
| 2002/0171791 A1 | 11/2002 | Ano et al. |
| 2004/0007704 A1 * | 1/2004 | Kim ............................ 257/59 |

FOREIGN PATENT DOCUMENTS

| | | |
|---|---|---|
| KR | 010025955 A | 6/2001 |
| KR | 2001-65037 | 7/2001 |
| KR | 010064973 A | 11/2001 |

* cited by examiner

ARRAY SUBSTRATE FOR A TRANSFLECTIVE LIQUID CRYSTAL DISPLAY DEVICE INCLUDING A REFLECTIVE PLATE HAVING A TRANSMISSIVE HOLE AND FABRICATING METHOD THEREOF

This application is a divisional of prior application Ser. No. 11/166,197, filed Jun. 27, 2005 now U.S. Pat. No. 7,468,767, which is a divisional of application Ser. No. 10/233,664, filed Sep. 4, 2002 now U.S. Pat. No. 6,919,934, and claims the benefit of Korean Patent Application No. 2001-55211, filed on Sep. 7, 2001, which is hereby incorporated by reference for all purposes as if fully set forth herein.

BACKGROUND OF THE INVENTION

1. Field of the Invention

The present invention relates to a liquid crystal display (LCD) device, and more particularly to a transflective LCD device that selectively uses reflective and transmissive modes.

2. Discussion of the Related Art

Generally, transflective LCD devices have functions of transmissive and reflective LCD devices at the same time. Since the transflective LCD devices can use both light of a backlight, and natural or artificial light of the exterior, the transflective LCD devices are not restricted from circumstances and a power consumption of the transflective LCD devices is reduced.

FIG. 1 is a schematic perspective view of a conventional transflective color LCD device.

In FIG. 1, the conventional transflective LCD device 11 includes an upper substrate having a transparent common electrode 13 on a black matrix 16 and a color filter layer 17, and a lower substrate 21 having a switching device "T" and gate line 25 and data line 39. The lower substrate 21 also has a pixel region "P" where a reflective plate 49 (of FIG. 2) that has a transmissive hole "A" and a transparent electrode 61 (of FIG. 2) are formed. The pixel region "P" is divided into a transmissive portion "B" and a reflective portion "D". Further, a liquid crystal layer 14 is interposed between the upper and lower substrates 15 and 21.

FIG. 2 is a schematic cross-sectional illustration of a conventional transflective LCD device.

In FIG. 2, a conventional transflective LCD device 11 includes an upper substrate 15 where a common electrode 13 is formed, a lower substrate 21 where a reflective plate 49 having a transmissive hole "A" and a transparent electrode 61 are formed, a liquid crystal layer 14 interposed between the upper and lower substrates 15 and 21, and a backlight 41 under the lower substrate 21. When the conventional transflective LCD device 11 is operated in a reflective mode, external natural or artificial light is used as a light source.

Operation of the conventional LCD device for reflective and transflective modes will be illustrated considering the above-mentioned structure.

In the reflective mode, the conventional transflective LCD device uses external natural or artificial light. Light "F2" incident on the upper substrate 15 is reflected at the reflective plate 49 and passes through the liquid crystal layer 14. The liquid crystal molecules in the liquid crystal layer 14 are aligned by an electric field between the reflective plate 49 and the common electrode 13. Here, the transmission of the light "F2" through the liquid crystal layer 14 is controlled according to the alignment of the liquid crystal layer 14 and images are displayed.

In the transmissive mode, light "F1" from the backlight 41 under the lower substrate 21 is used as a light source. The light "F1" emitted from the backlight 41 is incident on the liquid crystal layer 14 through a transparent electrode 61. Transmission of the light "F1" through the liquid crystal Layer 14 is controlled according to an alignment of the liquid crystal molecules in the liquid crystal layer 14 driven by an electric field between the transparent electrode 61 under the transmissive hole "A" and the common electrode 13. Thus, images can be displayed.

FIG. 3 is a schematic plan view of an array substrate for a conventional transflective LCD device.

In FIG. 3, a lower substrate 21, referred to as an array substrate, includes a thin film transistors (TFT) "T" in matrix. The TFTs act as switching devices. Each TFT "T" is connected to a gate line 25 and a data line 39. A gate pad 27 is formed at one end of the gate line 25, and the gate pad 27 is wider than the gate line 25. A data pad 41 that is wider than the data line 39 is formed at one end of the data line 39. The gate pad 27 and the data pad 41 contact a transparent gate pad terminal 63 and a transparent data pad terminal 65, respectively. External signals are directly applied to the transparent gate pad terminal 63 and the transparent data pad terminal 65. An insulating layer is interposed between the gate line 25 and the data line 39. An align key 80 is formed at a non-display region of the lower substrate 21 during a process of forming the gate line 25. The align key 80 provides a basis for aligning all patterns over the gate line 25 at a correct position. Here, a pixel region "P" is defined by the gate line 25 and the data line 39. A storage capacitor "C" is formed over a portion of the gate line 25 and connected in parallel to a transparent pixel electrode of the pixel region "P". The TFT "T" includes a gate electrode 23, an active layer 31, and source and drain electrodes 35 and 37. Here, a transparent electrode 61 and a reflective plate 49 having a transmissive hole constitute a transflective pixel electrode of the pixel region "P".

FIGS. 4A to 4C are schematic cross-sectional views illustrating a fabricating process of an array substrate for a conventional transflective LCD device. FIGS. 4A to 4C are taken along the line IV-IV of FIG. 3.

In FIG. 4A, after a gate electrode 23, a gate line 25 and a gate pad 27 are formed on a substrate 21, a gate insulating layer 29, i.e., a first insulating layer, is formed thereon. The gate pad 27 is disposed at one end of the gate line 25. The gate insulating layer 29 of about 4000 Å in thickness including one of inorganic material group including silicon nitride (SiNx) and silicon oxide ($SiO_2$). Next, an active layer 31 and an ohmic contact layer 33 of an island shape are formed on the gate insulating layer 29 over the gate electrode 23. Next, source and drain electrodes 35 and 37 are formed on the ohmic contact layer 33. A data line 39 connected to the source electrode 35; a data pad 41 at one end of the data line 39; and a capacitor electrode 43 of an island shape over the gate line 25 are formed at the same time.

In FIG. 4B, a planarization layer 45, when is a second insulating layer, is formed on an entire surface of the substrate 21 through depositing one of a transparent organic insulating material group including benzocyclobutene (BCB) and acrylic resin. A third insulating layer 47 of one of an inorganic insulating material group including SiNx and $SiO_2$ is sequentially formed on the planarization layer 45 through a plasma enhanced chemical vapor deposition (PECVD) method. The third insulating layer 47 of the inorganic material is further formed on the planarization layer 45 of the organic material to prevent fine organic materials from detaching from the surface of the organic material during the process of forming a reflective plate 49. Defects may occur at a surface of the planarization layer 45 due to high speed metal ions during the process of forming the reflective plate 49 on the planarization layer 45 by using a sputtering method. Fine organic materials detaching from those defects may contaminate a chamber. A reflective plate 49 having a transmissive hole "A" at the pixel region "P" is formed on an the third insulating layer 47 through depositing by a PECVD method and patterning aluminum (Al) or Al alloy.

In FIG. 4C, a passivation layer 51, which is a fourth insulation layer, having a drain contact hole 53, a storage contact hole 55, a gate pad contact hole 57 and a data pad contact hole 59 is formed on an entire surface of the substrate 21 through depositing and patterning one of inorganic insulating material group including SiNx and $Sio_2$. The drain contact hole 53 exposes the drain electrode 37; a storage contact hole 55 exposes the capacitor electrode 43; a gate pad contact hole 57 exposes the gate pad 27; and a data pad contact hole 59 exposes the data pad 41. Next, a pixel electrode 61 connected to the drain electrode 37 and to the capacitor electrode 43 is formed at the pixel region "P" through depositing and patterning one of a transparent conductive metallic material group including indium-tin-oxide (ITO) and indium-zinc-oxide (IZO). A gate pad terminal 63 contacting the gate pad 27 and a data pad terminal 65 contacting the data pad 41 are formed at the same time. An align key 80 (of FIG. 3) is simultaneously formed at a non-display region during a process of forming the gate line 25 and used to align a mask and the substrate 21.

FIG. 5 is a schematic cross-sectional view showing a structure of an align key. FIG. 5 is taken along the line V-V of FIG. 3.

In FIG. 5, an align key 80 of the same material as the gate line 25 and the gate electrode 23 is simultaneously formed on a substrate 21 during a process of forming the gate line 25 and the gate electrode 23. Generally, the align key 80 is disposed at a non-display region where images are not displayed. First, second, third and fourth insulating layers 29, 45, 47 and 51 are sequentially formed on the align key 80.

FIGS. 6A to 6D are schematic cross-sectional views showing a process of forming a reflective plate by using an align key. FIGS. 6A to 6C are taken along the line V-V.

In FIG. 6A, a metal layer 48 is formed on a third insulating layer 47 through depositing one of Aluminum and Aluminum alloy. After forming a photoresist (PR) layer 82 on the metal layer 48, an exposing process is performed with a first mask 84 disposed over the PR layer 82. The first mask 84 has a transmissive portion "G" corresponding to the align key 80.

In FIG. 6B, after a developing process is performed, a portion "H" of the metal layer 48 is etched to form a reflective plate 49 (of FIG. 6D) without misalignment. A second mask 86 (of FIG. 6C) for patterning the reflective plate 49 (of FIG. 6D) is aligned with the align key 80 of the lowest layer on the substrate 21. That is, the second mask 86 (of FIG. 6C) is precisely disposed through aligning another align key 87 (of FIG. 6C) of the second mask 86 (of FIG. 6C) with the align key 80 of the substrate 21 by using an aligner (not shown). The aligner perceives an aligned state by irradiating light to another align key 87 (of FIG. 6C) of the second mask 86 (of FIG. 6C) and the align key 80 of the substrate 21 and receiving the reflected light. If the aligner does not detect the align key 80 of the substrate 21, bad patterns are formed due to a misalignment. Accordingly, the align key 80 of the substrate 21 may be formed to have an uneven shape. If a surface of layers over the align key 80 is flat, the layers may be transparent so that light can pass through the layers. If layers over the align key 80 are opaque, the layers may have an uneven surface according to a step of the align key 80 so that align key 80 can be indirectly exposed. In the process of forming the reflective plate, however, since the opaque metal layer 48 is formed over a second insulating layer 45 planarizing a surface, the align key 80 cannot be detected. Therefore, as shown in FIG. 6B, a portion of the metal layer 48 corresponding to the align key 80 should be etched first. After the portion of the metal layer 48 is eliminated, since the first, second and third insulating layers 29, 45 and 47 are transparent, the light irradiated from the aligner (not shown) passes through the first, second and third insulating layers 29, 45 and 47 so that the align key 80 can be detected.

In FIG. 6C, a second mask 86 is precisely disposed over the substrate 21 through aligning the align key 87 of the second mask 86 with the align key 80 of the substrate 21. The second mask 86 includes a shielding region "I" corresponding to a reflective plate 49 (of FIG. 6D) and a transmissive region "J" corresponding to a transmissive hole "A" (of FIG. 6D).

In FIG. 6D, after a process of exposure and development, the metal layer 48 (of FIG. 6C) is etched to form a reflective plate 49 having a transmissive hole "A."

In the array substrate for the conventional transflective LCD device, since the organic insulating layer is formed on the TFT, a channel region of the active layer directly contacts the organic insulating layer. A contact property between the organic insulating layer and the active layer is not good. Accordingly, leakage current may be generated and an operating property of the TFT may be degraded due to defects between the organic insulating layer and the active layer.

Further, to prevent a contamination of the chamber by the organic material during the process of depositing the metal layer on the organic insulating layer, an additional inorganic insulating layer may be interposed between the organic insulating layer and the metal layer by a PECVD method. Accordingly, processes become complex and the cost of materials increases.

Moreover, since additional photolithography and etching processes are necessary to expose the align key during the process of forming the reflective plate, the production yield decreases.

SUMMARY OF THE INVENTION

Accordingly, the present invention is directed to a liquid crystal display device that substantially obviates one or more of problems due to limitations and disadvantages of the related art.

An advantage of the present invention is to provide an array substrate for a transflective liquid crystal display device and a method of fabricating a transflective liquid crystal display device in which the operating property of a thin film transistor is improved and a fabricating process is simplified by sequentially forming an inorganic insulating layer and an organic insulating layer on the thin film transistor and interposing a reflective plate between the inorganic insulating layer and the organic insulating layer.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device includes a substrate; a gate electrode and a gate line on the substrate; a first insulating layer on the gate electrode and the gate line; an active layer on the first insulating layer over the gate electrode; an ohmic contact layer on the active layer; source and drain electrodes on the ohmic contact layer; a data line connected to the source electrode, the data line defining a pixel region with the gate line; a second insulating layer on the data line, and the source and drain electrodes, the second insulating layer having an inorganic material; a reflective plate on the second insulating layer at the pixel region, the reflective plate having a transmissive hole; a third insulating layer on the reflective plate; and a pixel electrode on the third insulating layer at the pixel region, the pixel electrode being transparent and connected to the drain electrode.

The first, second and third insulating layers have a groove corresponding to the transmissive hole in common, and the second insulating layer has one of an inorganic insulating material group including silicon nitride and silicon oxide. The third insulating layer has one of an organic insulating material group including benzocyclobutene and acrylic resin.

In another aspect, a method of fabricating an array substrate for a transflective liquid crystal display device includes: forming a gate electrode and a gate line on the substrate; depositing a first insulating layer on the gate electrode and the gate line; forming an active layer on the first insulating layer over the gate electrode; forming an ohmic contact layer on the active layer; forming source and drain electrodes on the ohmic contact layer, and a data line connected to the source electrode, the data line defining a pixel region with the gate line; depositing a second insulating layer on the source and drain electrodes, and the data line, the second insulating layer having an inorganic material; forming a reflective plate on the second insulating layer at the pixel region, the reflective plate having a transmissive hole; forming a third insulating layer on the reflective plate; and forming a pixel electrode on the third insulating layer at the pixel region, the pixel electrode being transparent and connected to the drain electrode.

The method of fabricating an array substrate for a transflective liquid crystal display device further includes etching the first and second insulating layers by using the reflective plate as an etching mask before depositing the third insulating layer. Etching the first and second insulating layers are performed in a dry etching method partially or fully. The fabricating method of an array substrate for a transflective liquid crystal display device further includes etching the first, second and third insulating layers to have a groove corresponding to the transmissive hole in common.

In another aspect, an array substrate for a transflective liquid crystal display device includes a substrate; a gate line on the substrate; a data line defining a pixel region with the gate line; a thin film transistor connected to the gate line and the data line; a first insulating layer over the gate line, the data line and the thin film transistor; the first insulating layer having an inorganic material; a reflective plate on the first insulating layer at the pixel region, the reflective plate having a transmissive hole; a second insulating layer on the reflective plate; and a pixel electrode on the second insulating layer at the pixel region, the pixel electrode being transparent and connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE
ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
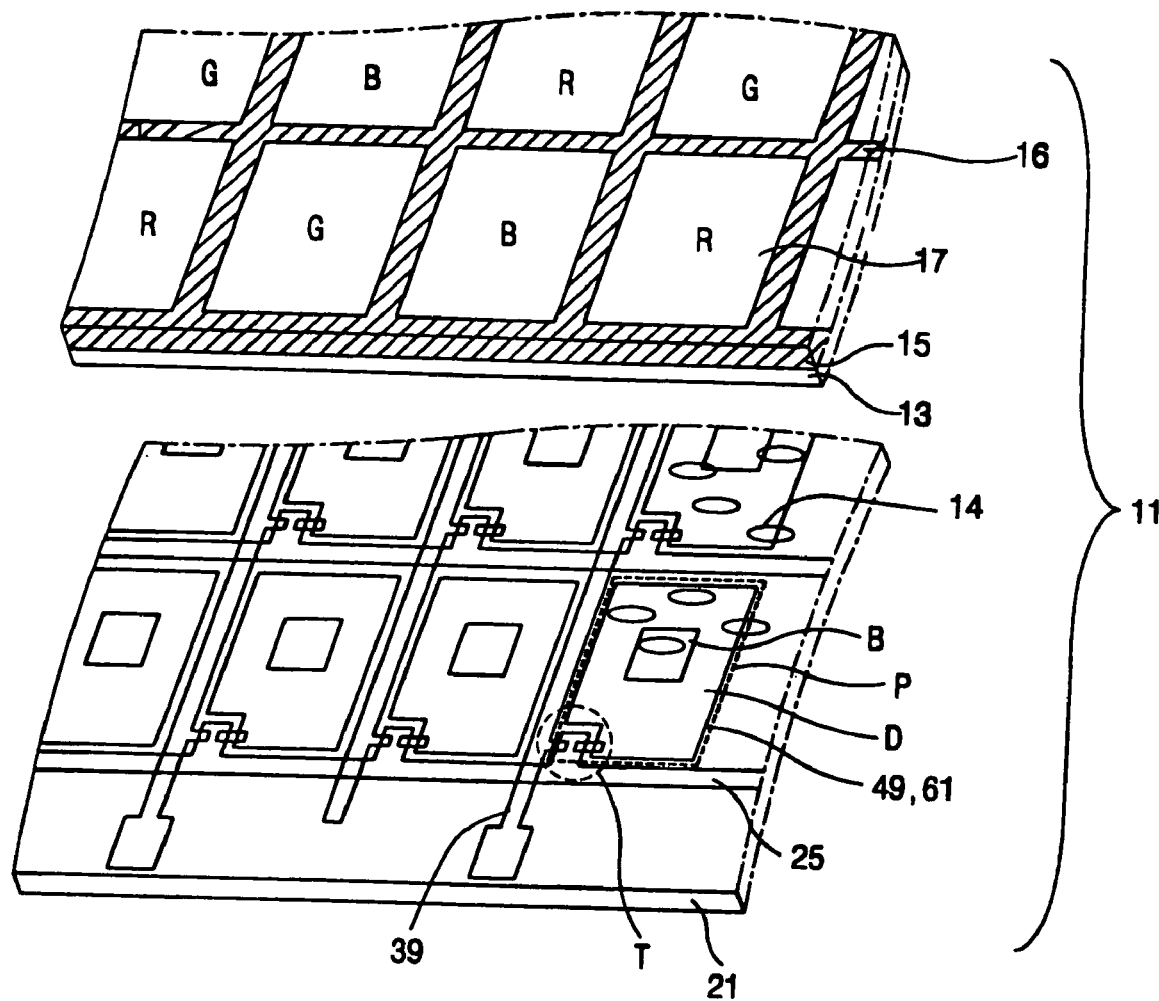
FIG. 1 is a schematic perspective view of a conventional transflective color LCD device.
Figure 2:
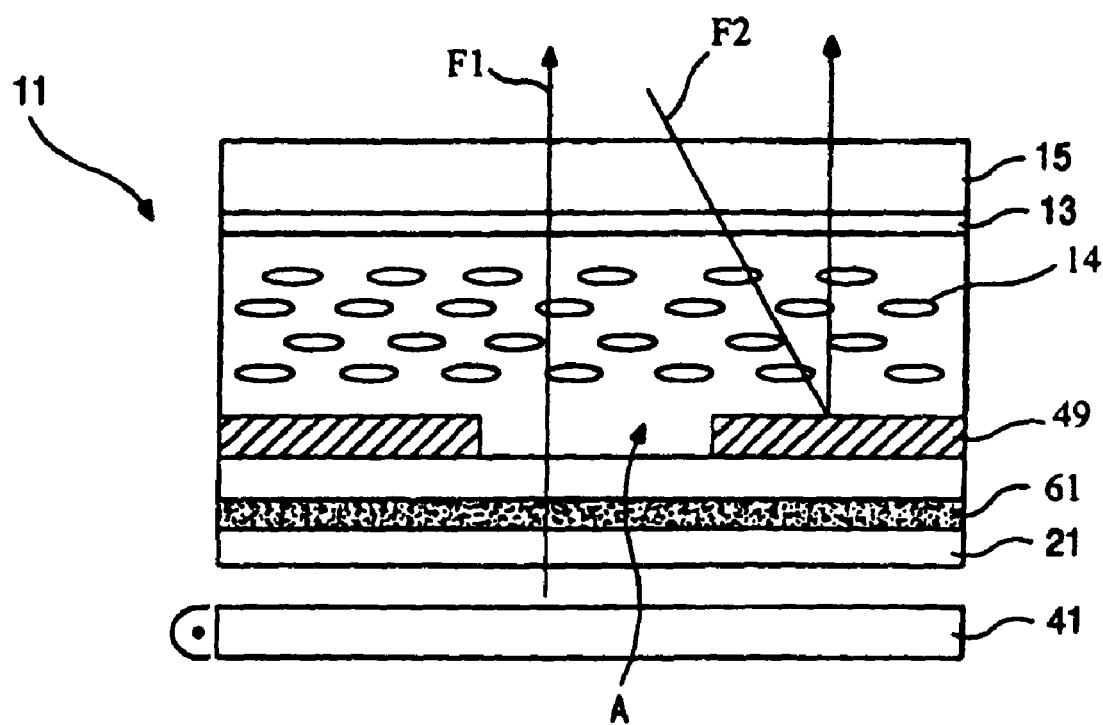
FIG. 2 is a schematic cross-sectional view of a conventional transflective LCD device.
Figure 3:
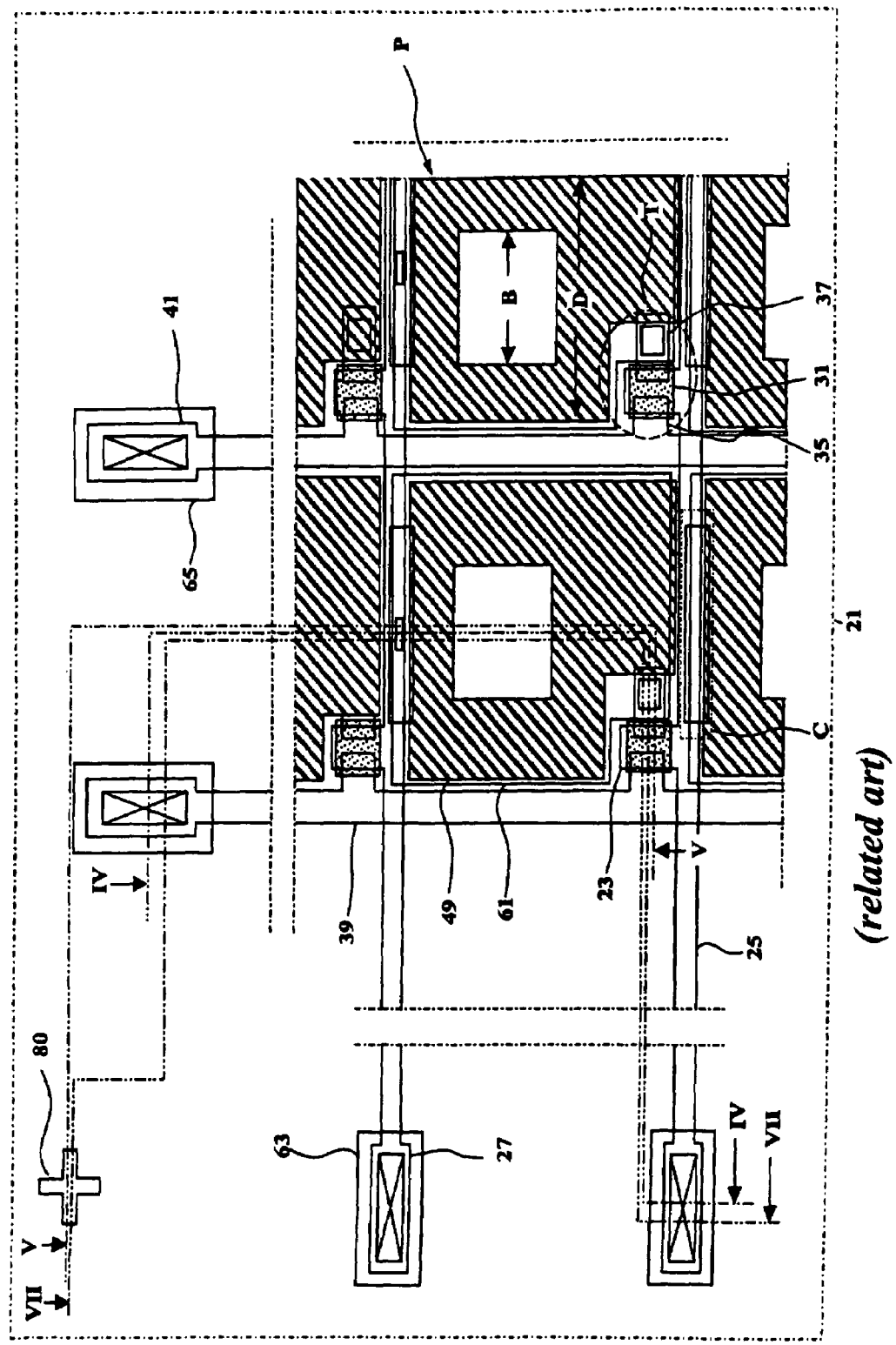
FIG. 3 is a schematic plan view of an array substrate for a conventional transflective LCD device.
Figure 4A:
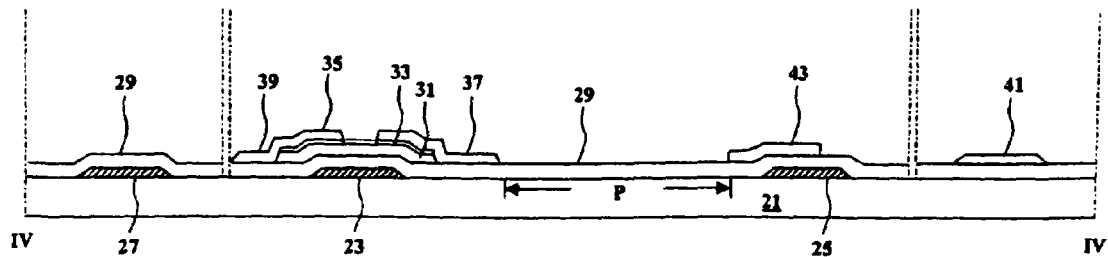
FIGS. 4A to 4C are schematic cross-sectional views illustrating a fabricating process of an array substrate for a conventional transflective LCD device.
Figure 4B:
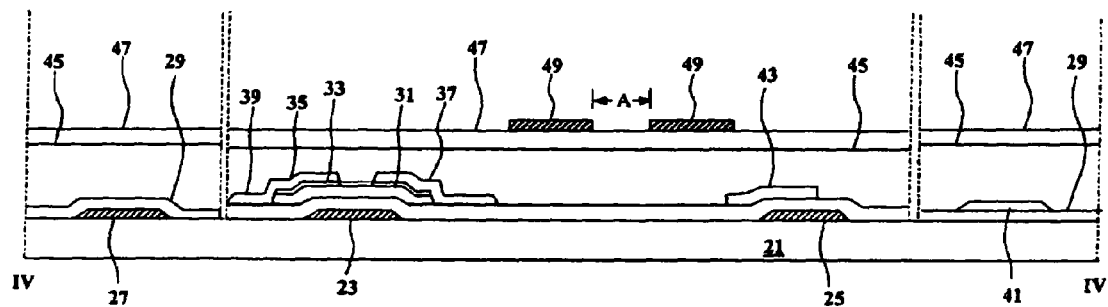
Figure 4C:
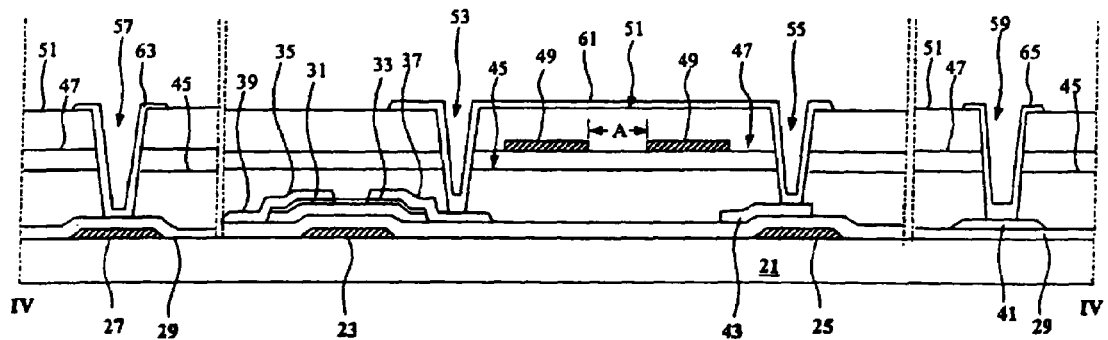
Figure 5:
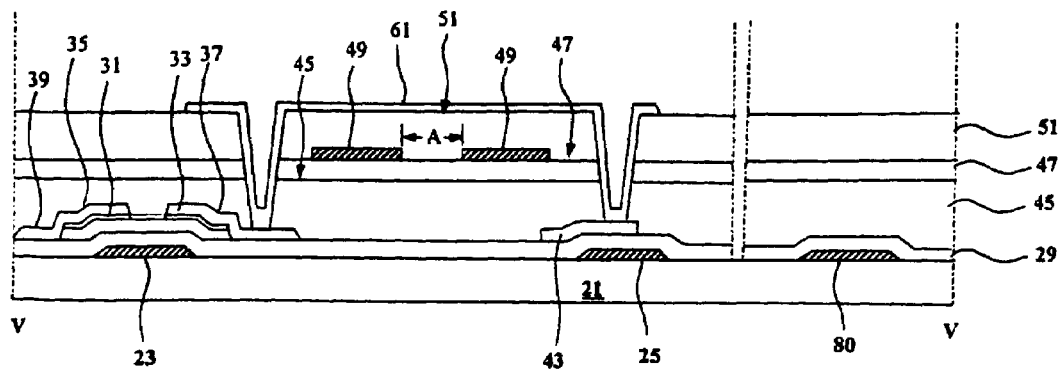
FIG. 5 is a schematic cross-sectional view showing a structure of an align key.
Figure 6A:
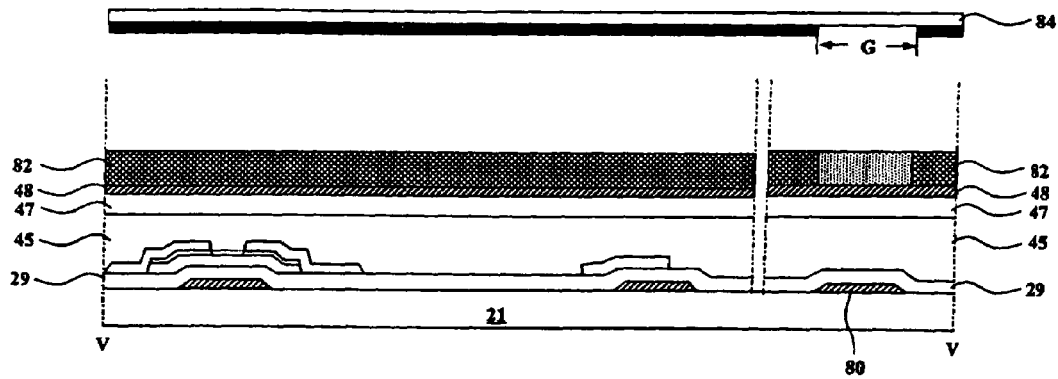
FIGS. 6A to 6D are schematic cross-sectional views illustrating a process of forming a reflective plate by using an align key.
Figure 6B:
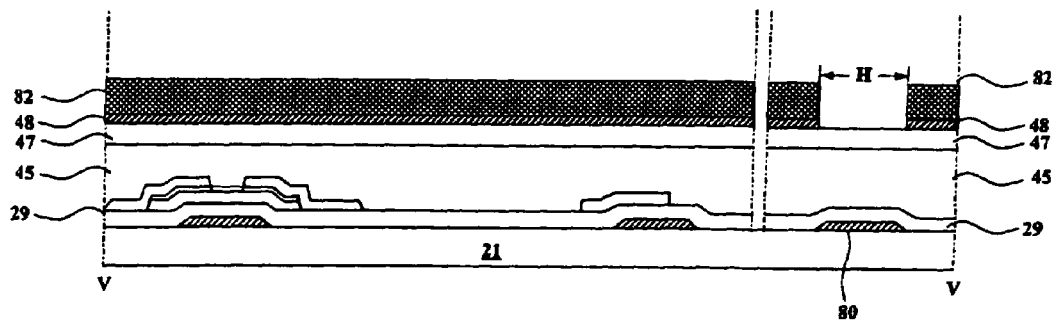
Figure 6C:
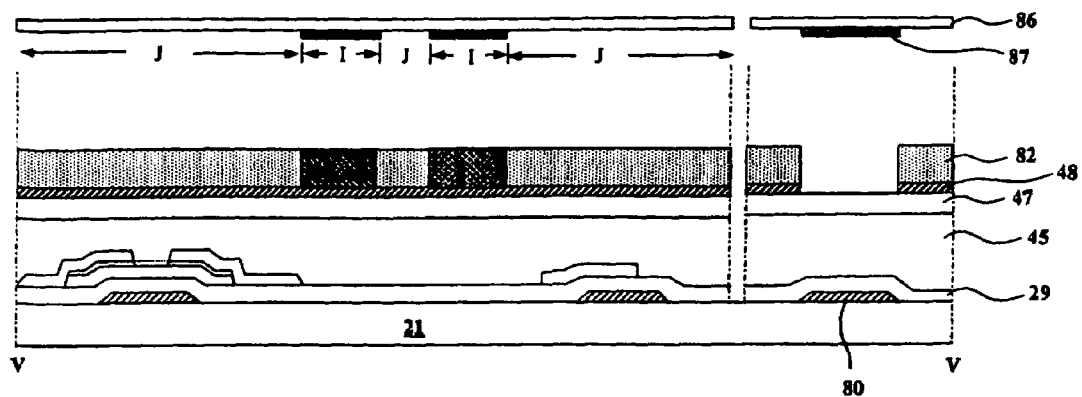
Figure 6D:
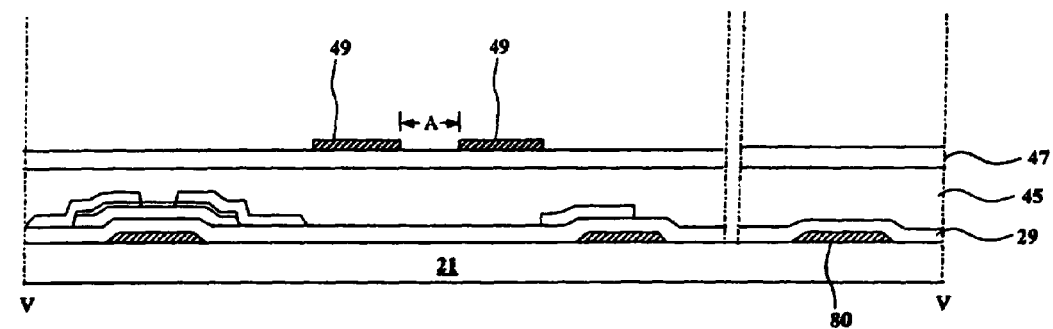

FIG. 7A to 7E are schematic cross-sectional views illustrating a fabricating process of an array substrate for a transflective liquid crystal display device according to a first embodiment of the present invention. For the purposes of explanation, FIGS. 7A to 7E are taken along the line VII-VII of FIG. 3. Other resulting structures for a transflective LCD are possible using the method described herein.

Figure 7A:
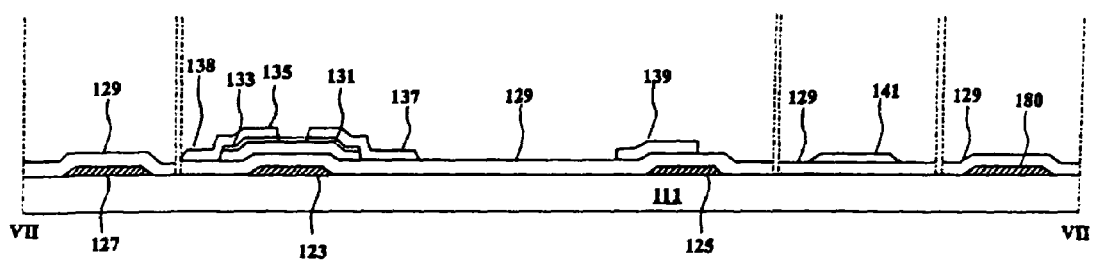
FIG. 7A to 7E are schematic cross-sectional views illustrating a fabricating process of an array substrate for a transflective liquid crystal display device according to a first embodiment of the present invention.

In FIG. 7A, a gate electrode 123 and a gate line 125 having a gate pad 127 at its one end are formed on a substrate 111. An align key 180 is simultaneously formed at a non-display region (not shown) of the substrate 111. Aluminum (Al) is widely used as a material of the gate electrode 123 and the gate line 125 to reduce RC delay (resistance-capacitance delay). However, since pure Aluminum is chemically susceptible and susceptible to a hillock during later processes at high temperature, multi-layers such as aluminum/molybdenum (Al/Mo) are used as the gate electrode 123 and the gate line 125. Next, a gate insulating layer 129 which is a first insulating layer, is formed on an entire surface of the substrate 111 by depositing an inorganic insulating material such as one of silicon nitride (SiNx) and silicon oxide (SiO$_2$). Next, an active layer 131 of amorphous silicon (a-Si:H) and an ohmic contact layer 133 of doped amorphous silicon (n+ a-Si:H) are sequentially formed on the first insulating layer 129 over the gate electrode 123 in an island shape. Next, source and drain electrodes 135 and 137, and a data line 138 having a data pad 141 at its one end are formed on the ohmic contact layer 133 by depositing and patterning a conductive metal such as one of chromium (Cr), molybdenum (Mo), antimony (Sb) and titanium (Ti). The data line 138 is connected to the source electrode 135. A capacitor electrode 139 of an island shape is formed over the gate line 125 at the same time as the data line 138.

Figure 7B:
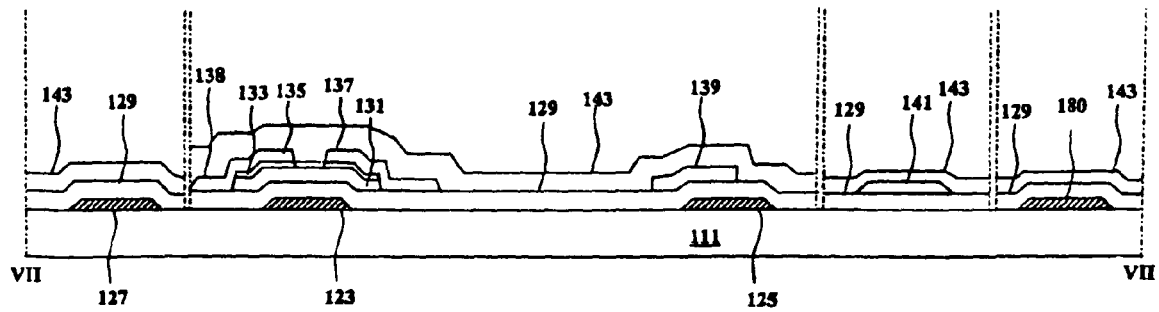

In FIG. 7B, a second insulating layer 143 is formed on an entire surface of the substrate 111 by depositing an inorganic insulating material such as one of silicon nitride (SiNx) and silicon oxide ($SiO_2$). The second insulating layer 143 is thin enough to have an unevenness because of the align key 180. That is, an unevenness caused by the align key 180 is indirectly exposed through the unevenness of the second insulating layer 143.

Figure 7C:
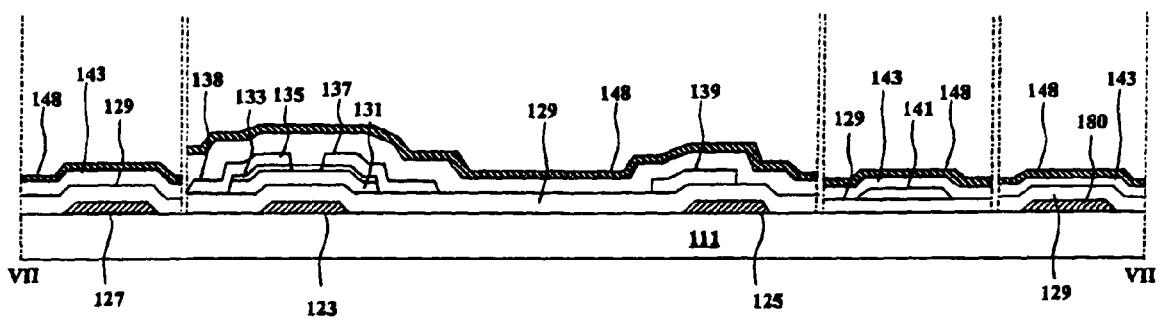

In FIG. 7C, a metal layer 148 is formed on the second insulating layer 143 by depositing a metal of high reflectance such as aluminum (Al) and aluminum (Al) alloy. Here, the metal layer 148 is about 2000 Å in thickness and formed according to the unevenness of the align key 180 through the second insulating layer 143. Thus, the unevenness of the align key may be exposed through the metal layer 148 even after the metal layer 148 is formed. Accordingly, an addition etching process of a portion of the metal layer 148 corresponding to the align key 180 is not necessary.

Figure 7D:
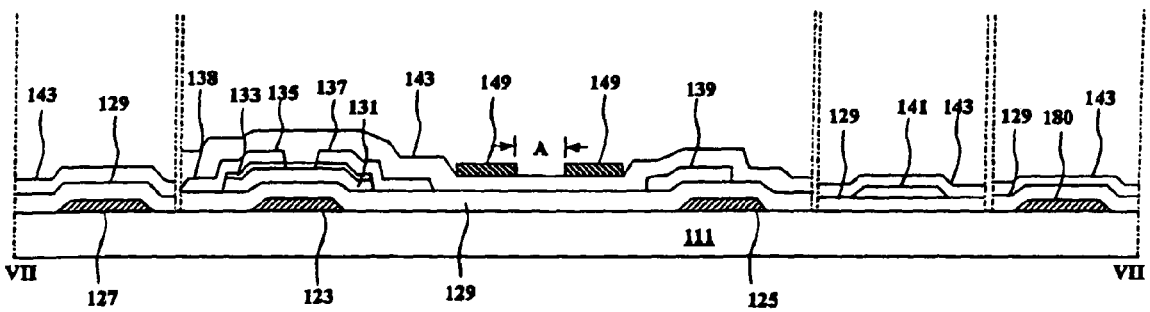

In FIG. 7D, a reflective plate 149 having a transmissive hole "A" is formed through photolithography and etching processes.

Figure 7E:
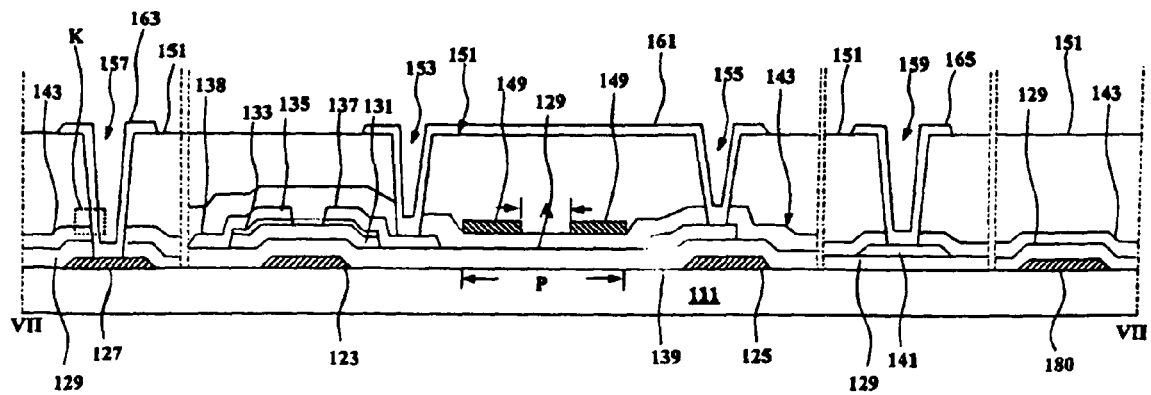

In FIG. 7E, a planarization layer 151, which is a third insulating layer, is formed on an entire surface of the substrate 111 by depositing one of an organic insulating material group such as one of benzocyclobutene (BCB) and acrylic resin. Then, a drain contact hole 153 exposing the drain electrode 137, a capacitor contact hole 155 exposing the capacitor electrode 139, a gate pad contact hole 157 exposing the gate pad 127 and a data pad contact hole 159 exposing the data pad 141 are made through simultaneously patterning the first, second and third insulating layers 129, 143 and 151. Next, a pixel electrode 161 is formed at a pixel region "P" by depositing and patterning a transparent conductive material such as indium-tin-oxide (ITO) and indium-zinc-oxide (IZO) on an entire surface of the substrate 111. The pixel electrode 161 is connected to the drain electrode 137 and the capacitor electrode 139. At the same time, a gate pad terminal 163 contacting the gate pad 127 and a data pad terminal 165 contacting the data pad 141 are formed.

In the first embodiment of the present invention, the first, second and third insulating layers are etched at one time to make several contact holes. Here, the first and second insulating layers of an inorganic insulating material may be over-etched due to an etching apparatus or an etching environment. Accordingly, an inverse-taper shape may be formed. This feature will be illustrated in FIG. 8 in detail.

Figure 8:
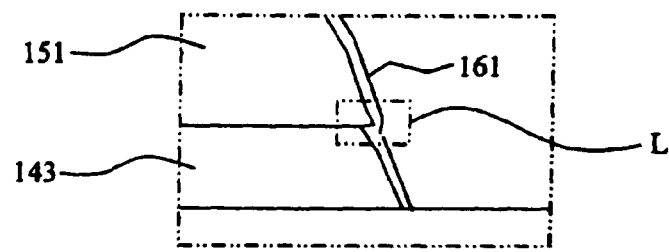
FIG. 8 is a schematic magnified cross-sectional view of a portion "K" of FIG. 7E.

FIG. 8 is a schematic magnified cross-sectional view of a portion "K" of FIG. 7E.

In FIG. 8, a second insulating layer 143 of an inorganic material and a third insulating layer 151 of an organic insulating material are etched at one time under several etching conditions such as kind of etching gas (for example, $SF_6/O_2$), etching gas ratio, etching gas flow rate or etching time. The second insulating layer 143 is etched faster than the third insulating layer 151 under almost every etching condition except a specific etching condition. Accordingly, an undercut, that is a step "L", between the second and third insulating layers 143 and 151 is generated. To solve these problems, a second embodiment is suggested.

FIGS. 9A to 9D are schematic cross-sectional views illustrating a process of fabricating an array substrate for a reflective liquid crystal display device according to a second embodiment of the present invention. For the purposes of explanation only, FIGS. 9A to 9D are taken along the line IV-IV of FIG. 3.

Figure 9A:
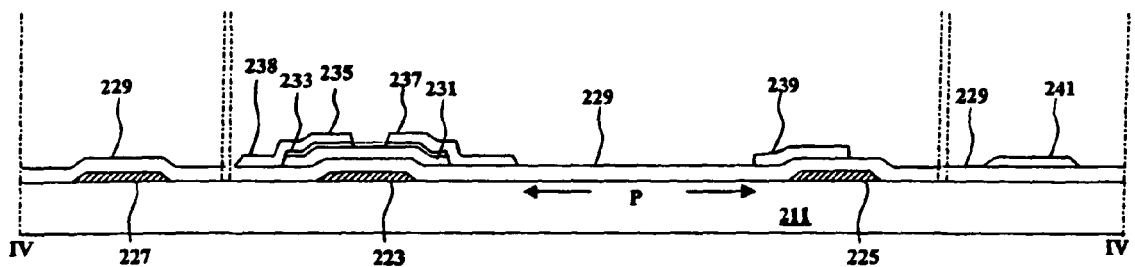
FIGS. 9A to 9D are schematic cross-sectional views illustrating a fabricating process of an array substrate for a reflective liquid crystal display device according to a second embodiment of the present invention.

In FIG. 9A, a gate electrode 223 and a gate line 225 having a gate pad 227 at its one end are formed on a substrate 211. An align key (not shown) is simultaneously formed at a non-display region (not shown) of the substrate 211. Aluminum (Al) is widely used as a material of the gate electrode 223 and the gate line 225 to reduce RC delay (resistance-capacitance delay). However, since pure Aluminum is chemically susceptible and susceptible to a hillock during later processes at high temperature, multi-layers such as aluminum/molybdenum (Al/Mo) are used as the gate electrode 223 and the gate line 225. Next, a gate insulating layer 229, which is a first insulating layer, is formed on an entire surface of the substrate 211 by depositing an inorganic insulating material such as one of silicon nitride (SiNx) and silicon oxide ($SiO_2$). Next, an active layer 231 of amorphous silicon (a-Si:H) and an ohmic contact layer 233 of doped amorphous silicon (n+ a-Si:H) are sequentially formed on the first insulating layer 229 over the gate electrode 223 in an island shape. Next, source and drain electrodes 235 and 237, and a data line 238 having a data pad 241 at its one end are formed on the ohmic contact layer 233 by depositing and patterning a conductive metal such as one of chromium (Cr), molybdenum (Mo), antimony (Sb) and titanium (Ti). The data line 238 is connected to the source electrode 235. At the same time, a capacitor electrode 239 of an island shape is formed over the gate line 225.

Figure 9B:
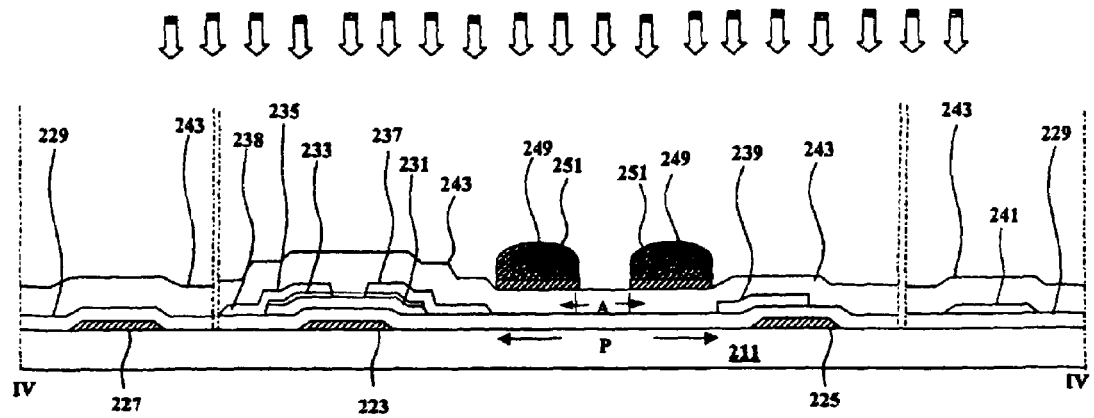

In FIG. 9B, a second insulating layer 243 is formed on an entire surface of the substrate 211 by depositing an inorganic insulating material such as one of silicon nitride (SiNx) and silicon oxide ($SiO_2$). The second insulating layer 243 is thin enough to have an unevenness because of the align key (not shown). That is, an unevenness of the align key (not shown) is indirectly exposed through the unevenness of the second insulating layer 243. Next, a reflective plate 249 having a transmissive hole "A" is formed on the second insulating layer 243 by depositing and patterning a metal of high reflectance such as one of aluminum (Al) and aluminum (Al) alloy. Here, a metal layer for the reflective plate 249 is about 2000 Å in thickness and formed according to the unevenness of the align key (not shown) through the second insulating layer 243. Thus, the unevenness of the align key (not shown) may be exposed through the metal layer even after the metal layer is formed. Accordingly, an additional etching of a portion of the metal layer for the reflective plate 249 corresponding to the align key (not shown) is not necessary. Here, a photoresist (PR) layer 251 used as an etching mask during forming of the reflective plate 249 is not removed even after forming reflective plate 249.

Figure 9C:
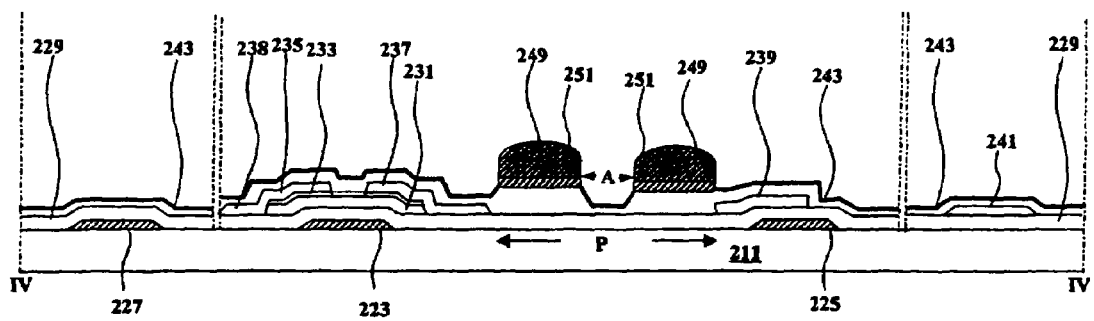

In FIG. 9C, the first and second insulating layers 229 and 243 are etched through a first dry etching process using the PR layer 251 and the reflective plate 249 as an etching mask. The first and second insulating layers 229 and 243 may be etched fully or partially during the first dry etching process.

Figure 9D:
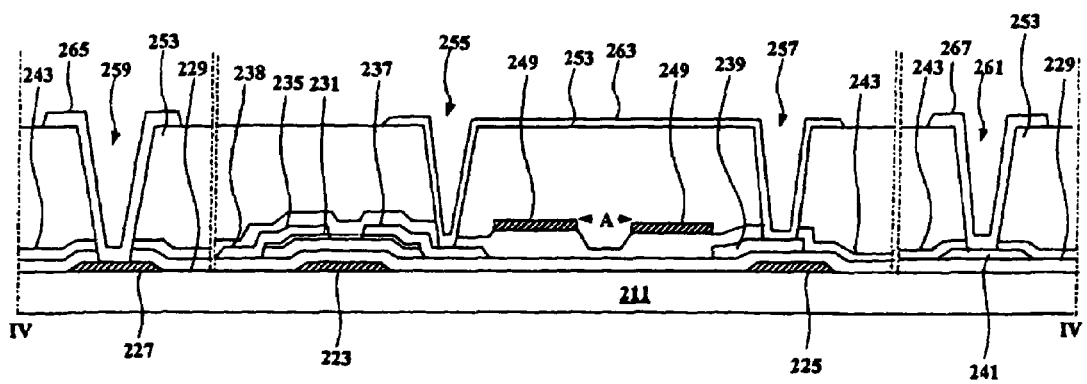

In FIG. 9D, a planarization layer 253, which is a third insulating layer is formed on an entire surface of the substrate 211 by depositing an organic insulating material such as one of benzocyclobutene (BCB) and acrylic resin. Then, a drain contact hole 255 exposing the drain electrode 237, a capacitor contact hole 257 exposing the capacitor electrode 239, a gate pad contact hole 259 exposing the gate pad 227 and a data pad contact hole 261 exposing the data pad 241 are made through simultaneously patterning the first, second and third insulating layers 229, 243 and 253. Here, a step is not generated on an inner surface of each contact hole. That is, since the first and second insulating layers 229 and 243 are fully or partially etched during the first dry etching process, an inverse taper shape is not generated in the second insulating layer 243. Next, a pixel electrode 263 is formed at a pixel region "P" by depositing and patterning a transparent conductive material such as one of indium-tin-oxide (ITO) and indium-zinc-oxide (IZO) on an entire surface of the substrate 211. The pixel electrode 263 is connected to the drain electrode 237 and the capacitor electrode 239. At the same time, a gate pad terminal 265 contacting the gate pad 227 and a data pad terminal 267 contacting the data pad 241 are formed.

To improve a display quality of a transflective LCD device, another embodiment of the present invention using a dual cell gap is suggested.

FIGS. 10A to 10D are schematic cross-sectional views illustrating a fabricating process of an array substrate for a transflective liquid crystal display device according to a third embodiment of the present invention. For the purposes of example only, FIGS. 10A to 10D are taken along the line IV-IV of FIG. 3.

Figure 10A:
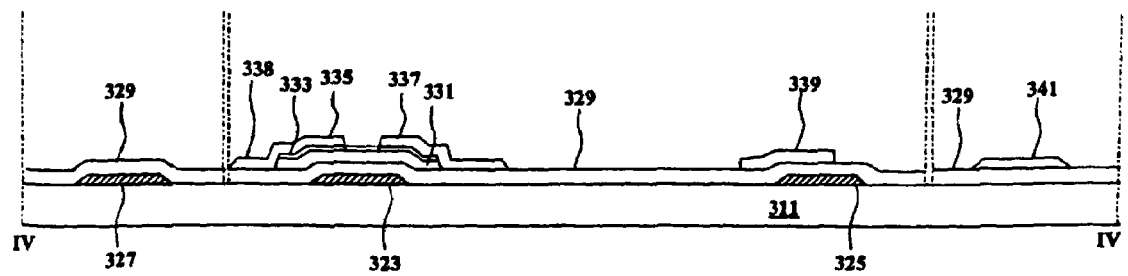
FIGS. 10A to 10D are schematic cross-sectional views illustrating a fabricating process of an array substrate for a transflective liquid crystal display device according to a third embodiment of the present invention.

In FIG. 10A, a gate electrode 323 and a gate line 325 having a gate pad 327 at its one end are formed on a substrate 311. An align key (not shown) is simultaneously formed at a non-display region (not shown) of the substrate 311. Next, a gate insulating layer 329, which is a first insulating layer is formed on an entire surface of the substrate 311 by depositing an inorganic insulating material such as one of silicon nitride (SiNx) and silicon oxide ($SiO_2$). Next, an active layer 331 of amorphous silicon (a-Si:H) and an ohmic contact layer 333 of doped amorphous silicon (n+ a-Si:H) are sequentially formed on the first insulating layer 329 over the gate electrode 323 in an island shape. Next, source and drain electrodes 335 and 337, and a data line 338 having a data pad 341 at its one end are formed on the ohmic contact layer 333 by depositing and patterning a conductive metal such as one of chromium (Cr), molybdenum (Mo), antimony (Sb) and titanium (Ti). The data line 338 is connected to the source electrode 335. At the same time, a capacitor electrode 339 of an island shape is formed over the gate line 325.

Figure 10B:
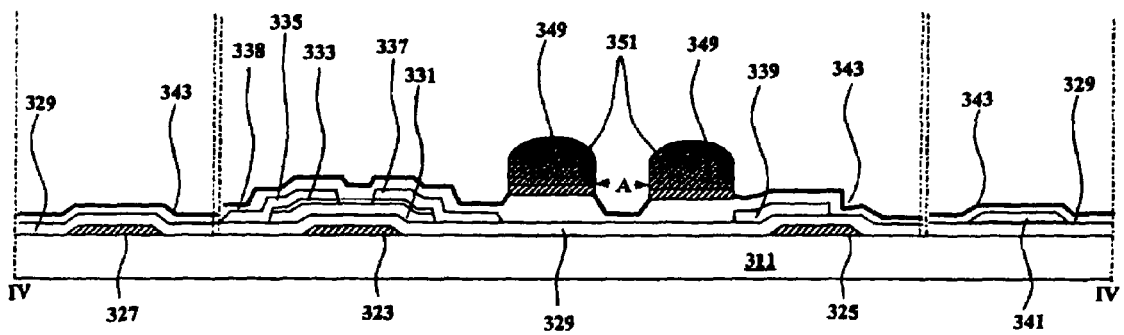

In FIG. 10B, a second insulating layer 343 is formed on an entire surface of the substrate 311 by depositing an inorganic insulating material such as one of silicon nitride (SiNx) and silicon oxide ($SiO_2$). The second insulating layer 343 is thin enough to have an unevenness because of the align key (not shown). That is, an unevenness of the align key (not shown) is indirectly exposed through the unevenness of the second insulating layer 343. Next, a reflective plate 349 having a transmissive hole "A" is formed on the second insulating layer 343 by depositing and patterning a metal of high reflectance such as one of aluminum (Al) and aluminum (Al) alloy. Here, a metal layer for the reflective plate 349 is about 2000 Å in thickness and formed according to the unevenness of the align key (not shown) through the second insulating layer 343. Thus, the unevenness of the align key (not shown) may be exposed through the metal layer even after the metal layer is formed. Accordingly, an additional etching of a portion of the metal layer for the reflective plate 249 corresponding to the align key (not shown) is not necessary. Here, a photoresist (PR) layer 351 used as an etching mask during forming of the reflective plate 349 is not removed even after forming reflective plate 349. Next, the first and second insulating layers 329 and 343 are etched through a first dry etching process using the PR layer 351 and the reflective plate 349 as an etching mask. The first and second insulating layers 329 and 343 may be etched fully or partially during the first dry etching process.

Figure 10C:
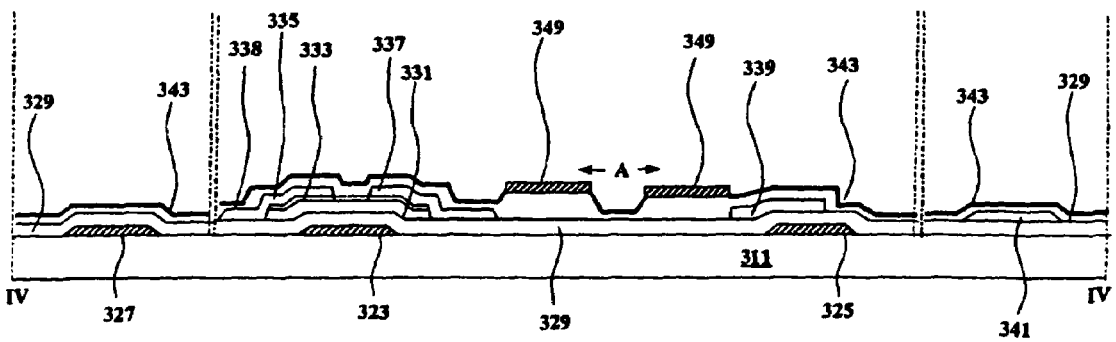

In FIG. 10C, after etching the first and second insulating layers 329 and 343, the PR layer 351 (of FIG. 10B) is removed.

Figure 10D:
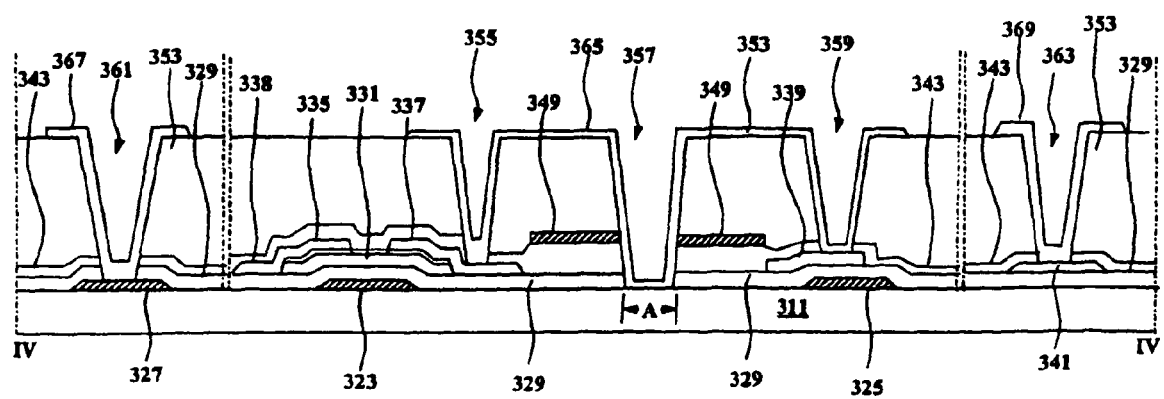

In FIG. 10D, a planarization layer 353, which is a third insulating layer, is formed on an entire surface of the substrate 311 by depositing an organic insulating material such as one of benzocyclobutene (BCB) and acrylic resin. Then, a drain contact hole 355 exposing the drain electrode 337, a capacitor contact hole 359 exposing the capacitor electrode 339, a gate pad contact hole 361 exposing the gate pad 327 and a data pad contact hole 363 exposing the data pad 341 are made through simultaneously patterning the first, second and third insulating layers 329, 343 and 353. A groove 357 corresponding to the transmissive hole "A" is also made at the same time to make a path of light passing through the transmissive hole substantially equal to a path of light reflected at the reflective plate 349. Therefore, a color difference between a transmissive portion and a reflective portion becomes small, and display quality is improved.

Here, a step is not generated on an inner surface of each contact hole. That is, since the first and second insulating layers 329 and 343 of an inorganic insulating material are fully or partially etched during the first dry etching process, an inverse taper shape is not generated in the second insulating layer 343 of an inorganic insulating material during an etching process for each contact hole. Next, a pixel electrode 365 is formed at a pixel region "P" by depositing and patterning a transparent conductive material such as one of indium-tin-oxide (ITO) and indium-zinc-oxide (IZO) on an entire surface of the substrate 311. The pixel electrode 365 is connected to the drain electrode 337 and the capacitor electrode 339. A gate pad terminal 367 contacting the gate pad 327 and a data pad terminal 369 contacting the data pad 341 are formed at the same time.

Consequently, an array substrate for a transflective liquid crystal display device according to the present invention has several advantages.

First, since an inorganic insulating layer having a good adhesion quality is formed on a thin film transistor, an operating property of the thin film transistor and a display quality of the liquid crystal display are improved.

Second, since a reflective plate is formed on an inorganic insulating layer and an organic insulating layer is formed on the reflective plate, a forming process of one insulating layer may be omitted.

Third, since an additional etching process to expose an align key of the substrate is omitted during a forming process of a reflective plate, a cost of materials is reduced and a production yield is improved due to a process simplification.

Fourth, since inorganic and organic insulating layers are etched by first and second dry etching processes for contact holes, a step portion on an inner surface of the contact holes is not generated, and an electrical break of a pixel electrode is prevented.

Fifth, since a groove corresponding to a transmissive hole is formed, a color difference between a transmissive portion and a reflective portion is reduced and a display quality is improved.

It will be apparent to those skilled in the art that various modifications and variations can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:
   a substrate having a non-display region;
   a gate electrode and a gate line on the substrate;
   a first insulating layer on the gate electrode and the gate line;
   an active layer on the first insulating layer over the gate electrode;
   an ohmic contact layer on the active layer;
   source and drain electrodes on the ohmic contact layer;
   a data line connected to the source electrode, the data line defining a pixel region with the gate line;
   a second insulating layer on the data line, and the source and drain electrodes, the second insulating layer having an inorganic material, wherein an align key is adequately detectable through the second insulating layer and wherein the align key is formed at the non-display region;
   a reflective plate on the second insulating layer at the pixel region, the reflective plate having a transmissive hole;
   a third insulating layer on the reflective plate; and
   a pixel electrode on the third insulating layer at the pixel region, the pixel electrode being transparent and connected to the drain electrode.

2. The substrate according to claim 1, wherein the first, second and third insulating layers have a groove corresponding to the transmissive hole in common.

3. The substrate according to claim 1, wherein the second insulating layer has one of an inorganic insulating material group including silicon nitride and silicon oxide.

4. The substrate according to claim 1, wherein the third insulating layer has one of an organic insulating material group including benzocyclobutene and acrylic resin.

5. An array substrate for a transflective liquid crystal display device, comprising:
   a substrate having a non-display region;
   a gate line on the substrate;
   a data line defining a pixel region with the gate line;
   a thin film transistor connected to the gate line and the data line;
   a first insulating layer over the gate line, the first insulating layer having an inorganic material, wherein a thin film transistor is connected to the gate and data lines;
   a reflective plate on the first insulating layer at the pixel region, the reflective plate having a transmissive hole;
   a second insulating layer on the reflective plate, wherein an align key is adequately detectable through the second insulating layer and the align key is formed at the non-display region; and
   a pixel electrode on the second insulating layer at the pixel region, the pixel electrode being transparent and connected to the thin film transistor.

6. The substrate according to claim 5, wherein the first and second insulating layers have a groove corresponding to the transmissive hole in common.

7. The substrate according to claim 5, wherein the second insulating layer has one of an inorganic insulating material group including silicon nitride and silicon oxide.

8. The substrate according to claim 5, wherein a third insulating layer has one of an organic insulating material group including benzocyclobutene and acrylic resin.

9. An array substrate for a transflective liquid crystal display device, comprising:
   a substrate;
   a gate electrode and a gate line on the substrate;
   a first insulating layer on the gate electrode and the gate line, wherein the first insulating layer has a groove corresponding to the transmissive hole;
   an active layer on the first insulating layer over the gate electrode;
   an ohmic contact layer on the active layer;
   source and drain electrodes on the ohmic contact layer;
   a data line connected to the source electrode, the data line defining a pixel region with the gate line;
   a second insulating layer on the data line, and the source and drain electrodes, the second insulating layer having an inorganic material;
   a reflective plate on the second insulating layer at the pixel region, the reflective plate having a transmissive hole;
   a third insulating layer on the reflective plate; and
   a pixel electrode on the third insulating layer at the pixel region, the pixel electrode being transparent and connected to the drain electrode.

10. The substrate according to claim 9, wherein the second insulating layer has one of an inorganic insulating material group including silicon nitride and silicon oxide.

11. The substrate according to claim 9, wherein the third insulating layer has one of an organic insulating material group including benzocyclobutene and acrylic resin.

12. An array substrate for a transflective liquid crystal display device, comprising:
   a substrate;
   a gate electrode and a gate line on the substrate;
   a first insulating layer on the gate electrode and the gate line;
   an active layer on the first insulating layer over the gate electrode;
   an ohmic contact layer on the active layer;
   source and drain electrodes on the ohmic contact layer;
   a data line connected to the source electrode, the data line defining a pixel region with the gate line;
   a second insulating layer on the data line, and the source and drain electrodes, the second insulating layer having an inorganic material;
   a reflective plate on the second insulating layer at the pixel region, the reflective plate having a transmissive hole;
   a third insulating layer on the reflective plate; and
   a pixel electrode on the third insulating layer at the pixel region, the pixel electrode being transparent and connected to the drain electrode,
   wherein the first, second and third insulating layers have a groove corresponding to the transmissive hole in common.

13. The substrate according to claim 12, wherein the second insulating layer has one of an inorganic insulating material group including silicon nitride and silicon oxide.

14. The substrate according to claim 12, wherein the third insulating layer has one of an organic insulating material group including benzocyclobutene and acrylic resin.

* * * * *